(12) United States Patent
Kwon et al.

(10) Patent No.: US 9,851,833 B2
(45) Date of Patent: Dec. 26, 2017

(54) INTEGRATION CIRCUIT, TOUCH INTERACTION SENSING APPARATUS, AND TOUCHSCREEN APPARATUS

(71) Applicant: Samsung Electronics Co., Ltd., Suwon-si, Gyeonggi-do (KR)

(72) Inventors: Yong Il Kwon, Suwon (KR); Byeong Hak Jo, Suwon (KR); Moon Suk Jeong, Suwon (KR); Tah Joon Park, Suwon (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 43 days.

(21) Appl. No.: 14/481,018

(22) Filed: Sep. 9, 2014

(65) Prior Publication Data

US 2015/0355777 A1 Dec. 10, 2015

(30) Foreign Application Priority Data

Jun. 5, 2014 (KR) .......................... 10-2014-0068235

(51) Int. Cl.
*G06F 3/041* (2006.01)
*G06F 1/32* (2006.01)
*G06G 7/186* (2006.01)
*G06F 3/044* (2006.01)

(52) U.S. Cl.
CPC .......... *G06F 3/0416* (2013.01); *G06F 1/3262* (2013.01); *G06F 3/044* (2013.01); *G06G 7/186* (2013.01); *Y02B 60/32* (2013.01)

(58) Field of Classification Search
CPC ........ G06F 3/0416; G06F 3/044; G06G 7/186
See application file for complete search history.

(56) References Cited

U.S. PATENT DOCUMENTS

| 6,092,211 A * | 7/2000 | Hozumi ..................... G06F 1/10 713/500 |
| 2005/0022037 A1* | 1/2005 | Burns ........................ G06F 1/08 713/300 |
| 2007/0171118 A1 | 7/2007 | Onishi |
| 2009/0121701 A1 | 5/2009 | Kim et al. |
| 2009/0231294 A1* | 9/2009 | Wu ...................... G06F 3/03547 345/173 |
| 2010/0123515 A1* | 5/2010 | Sasaki .................. G06F 1/3203 327/540 |
| 2010/0327974 A1* | 12/2010 | Yazdi .................. H03F 3/45183 330/253 |

(Continued)

FOREIGN PATENT DOCUMENTS

| KR | 10-2007-0017408 | 2/2007 |
| KR | 10-0910861 | 7/2009 |

(Continued)

*Primary Examiner* — Nicholas Lee
*Assistant Examiner* — Robert Stone
(74) *Attorney, Agent, or Firm* — F. Chau & Associates, LLC

(57) ABSTRACT

An integration circuit may include a plurality of switches, at least one operational amplifier, and at least one feedback capacitor, sequentially transfers electrical charges charged in a node capacitor to the feedback capacitor, and integrates the electrical charges. The operational amplifier may be synchronized with a clock signal applied to at least one of the plurality of switches to thereby be operated in one of a normal mode and a low power mode.

4 Claims, 6 Drawing Sheets

(56) References Cited

U.S. PATENT DOCUMENTS

| | | | |
|---|---|---|---|
| 2012/0092297 A1 | 4/2012 | Han | |
| 2014/0009216 A1* | 1/2014 | Jo | G06F 3/0418 327/517 |
| 2014/0225858 A1* | 8/2014 | Jo | G06F 3/0418 345/174 |
| 2014/0313146 A1* | 10/2014 | Munechika | G06F 3/041 345/173 |

FOREIGN PATENT DOCUMENTS

| | | |
|---|---|---|
| KR | 10-2012-0040037 | 4/2012 |
| KR | 10-1135703 | 4/2012 |

\* cited by examiner

INTEGRATION CIRCUIT, TOUCH INTERACTION SENSING APPARATUS, AND TOUCHSCREEN APPARATUS

CROSS-REFERENCE TO RELATED APPLICATION

This application claims the benefit of Korean Patent Application No. 10-2014-0068235 filed on Jun. 5, 2014, with the Korean Intellectual Property Office, the disclosure of which is incorporated herein by reference.

BACKGROUND

The present disclosure relates to an integration circuit, a touch interaction sensing apparatus, and a touchscreen apparatus.

A capacitive-type touchscreen may include a plurality of electrodes having a predetermined pattern and defining a plurality of nodes in which changes in capacitance are generated by touch interactions. In such a plurality of nodes distributed on a two-dimensional plane, changes in self-capacitance or in mutual-capacitance are generated by touch interactions. Coordinates of such touch interactions may be calculated by applying a weighted average calculation method, or the like, to the changes in the capacitance generated in the plurality of nodes.

In accordance with the growing number of mobile devices having relatively large screens, the sizes of touchscreens have increased, such that amounts of electrodes provided in touchscreens have accordingly increased. In the case in which the number of electrodes provided in touchscreens is increased, the number of capacitance detecting circuits respectively connected to the electrodes may be increased accordingly, such that power consumption may also be increased.

RELATED ART DOCUMENT (Patent Document 1) Korean Patent Laid-Open Publication No. 10-2007-0017048

SUMMARY

An exemplary embodiment in the present disclosure may provide an integration circuit, a touch interaction sensing apparatus, and a touchscreen apparatus capable of solving a problem of an increase in power consumption.

According to an exemplary embodiment in the present disclosure, an integration circuit may include a plurality of switches, at least one operational amplifier, and at least one feedback capacitor, sequentially transfer electrical charges charged in a node capacitor to the feedback capacitor, and integrate the electrical charges, wherein the operational amplifier is synchronized with a clock signal applied to at least one of the plurality of switches to thereby be operated in one of a normal mode and a low power mode.

According to an exemplary embodiment in the present disclosure, a touch interaction sensing apparatus may include: a driving signal generating circuit applying a driving signal to a node capacitor; and an integration circuit integrating electrical charges charged in the node capacitor to generate a voltage signal, wherein the integration circuit is operated in a low power mode in a time section in which the electrical charges are charged in the node capacitor.

According to an exemplary embodiment in the present disclosure, a touchscreen apparatus may include: a panel unit including a plurality of first electrodes extended in a first direction and a plurality of second electrodes extended in a second direction intersecting with the first direction; a driving circuit unit applying driving signals to the plurality of first electrodes; and a sensing circuit unit connected to the plurality of second electrodes to detect capacitance formed in intersection points between the plurality of first electrodes and the plurality of second electrodes, wherein the sensing circuit unit includes a plurality of integration circuits each connected to the plurality of second electrodes, each of the plurality of integration circuits including a plurality of switches, at least one operational amplifier, and at least one feedback capacitor and integrating capacitance, and the operational amplifier being operated in one of a normal mode and a low power mode.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
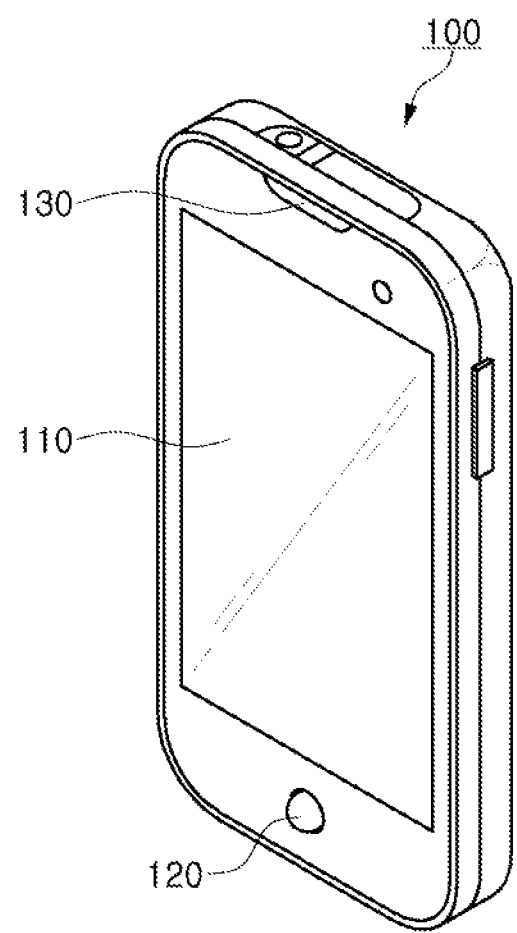
FIG. 1 is a perspective view illustrating an exterior of an electronic device including a touchscreen apparatus according to an exemplary embodiment in the present disclosure.

Hereinafter, exemplary embodiments of the present disclosure will be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

FIG. 1 is a perspective view illustrating an exterior of an electronic device including a touchscreen apparatus according to an exemplary embodiment of the present disclosure.

Referring to FIG. 1, an electronic device 100 according to the present exemplary embodiment may include a display apparatus 110 for displaying an image, an input unit 120, an audio unit 130 for outputting audio, and a touchscreen apparatus (not illustrated in FIG. 1) integrated with the display apparatus 110.

The touchscreen apparatus according to an exemplary embodiment of the present disclosure may include a panel unit including a substrate and a plurality of electrodes formed on the substrate. In addition, the touchscreen apparatus may include a touch interaction sensing apparatus including a capacitance sensing circuit detecting changes in capacitance generated in the plurality of electrodes, an analog-to-digital conversion circuit converting an output signal of the capacitance sensing circuit into a digital value, a calculating circuit judging a touch interaction using data converted into the digital value, and the like. A detailed description thereof will be provided below with reference to FIGS. 2 through 8.

Figure 2:
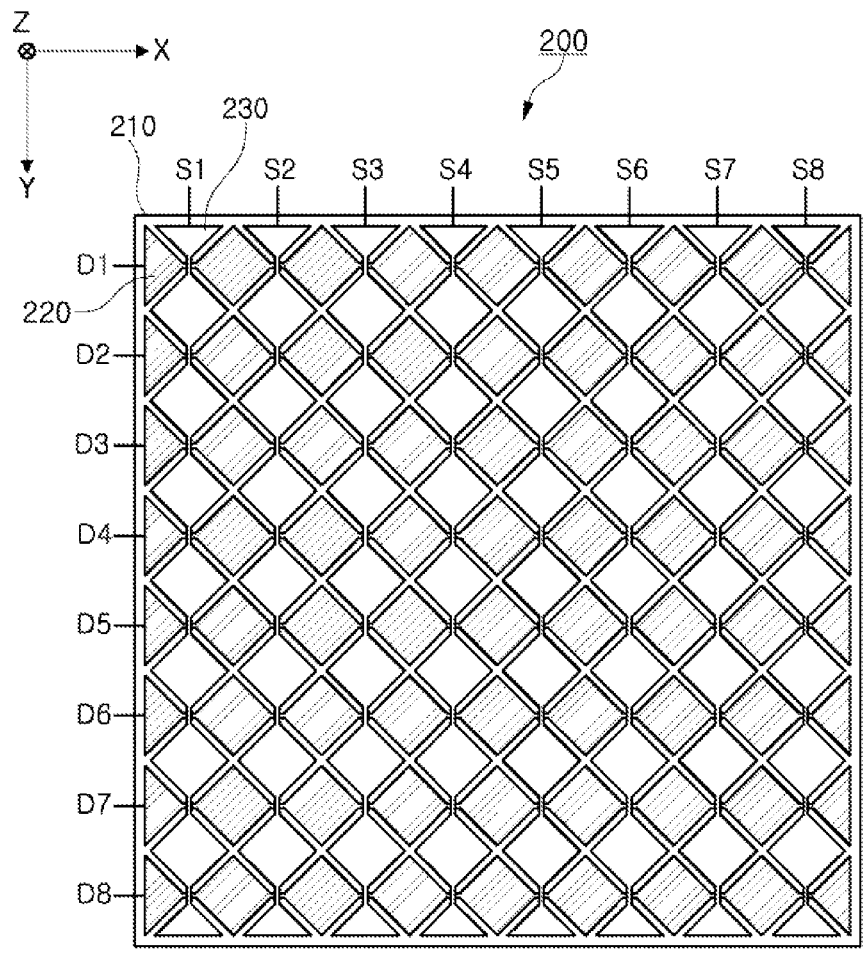
FIG. 2 is a view illustrating a panel unit included in the touchscreen apparatus according to an exemplary embodiment in the present disclosure.

FIG. 2 is a view illustrating a panel unit included in the touchscreen apparatus according to an exemplary embodiment of the present disclosure.

Referring to FIG. 2, a panel unit 200 according to the present exemplary embodiment may include a substrate 210 and a plurality of electrodes 220 and 230 formed on the substrate 210. Although not illustrated in FIG. 2, the plurality of electrodes 220 and 230 may be electrically connected to wiring patterns of a circuit board attached to one end of the substrate 210 through wirings and bonding pads, respectively. Here, a controller integrated circuit may be mounted on the circuit board to detect sensed signals generated in the plurality of electrodes 220 and 230 and detect a touch interaction from the sensed signals.

The substrate 210 may be formed of a material such as a polyethylene terephthalate (PET) film, a polycarbonate (PC) film, a polyethersulfone (PES) film, a polyimide (PI) film, a polymethylmethacrylate (PMMA) film, a cyclo-olefin polymers (COP) film, a soda glass, or a tempered glass to have high light transmittance.

The plurality of electrodes 220 and 230 may be formed on one surface or both surfaces of the substrate 210. The plurality of electrodes 220 and 230 have rhombus or diamond shaped patterns as illustrated in FIG. 2, but may also have various polygonal patterns such as rectangular patterns, triangular patterns, or the like. The plurality of electrodes 220 and 230 may be formed of a material such as an indium tin oxide (ITO), an indium zinc oxide (IZO), a zinc oxide (ZnO), carbon nanotubes (CNT), or a graphene having electrical conductivity, or may be formed of any one of silver (Ag), aluminum (Al), chrome (Cr), nickel (Ni), molybdenum (Mo), and copper (Cu), or alloys thereof.

The plurality of electrodes 220 and 230 may include first electrodes 220 extended in an X axis direction and second electrodes 230 extended in a Y axis direction. The first electrodes 220 and the second electrodes 230 may be formed on both surfaces of the substrate 210, respectively, or be formed on different substrates 210, respectively, and intersect each other. In the case in which both of the first electrodes 220 and the second electrodes 230 are formed on one surface of the substrate 210, predetermined insulating layers may be partially formed in intersection points between the first electrodes 220 and the second electrodes 230.

In addition, on the substrate 210, a predetermined printing region (not illustrated) for visually shielding the wirings generally formed of an opaque metal may be formed in a region in which the wirings connected to the plurality of electrodes 220 and 230 are formed, except for on the plurality of electrodes 220 and 230 themselves.

A touch interaction sensing apparatus (not illustrated) electrically connected to the plurality of electrodes 220 and 230 may provide driving signals to the first electrodes 220 through channels defined as D1 to D8 and may be connected to channels defined as S1 to S8 to detect capacitance. Here, a touch interaction may be detected depending on changes in capacitance generated in intersection points between the first and second electrodes 220 and 230.

Figure 3:
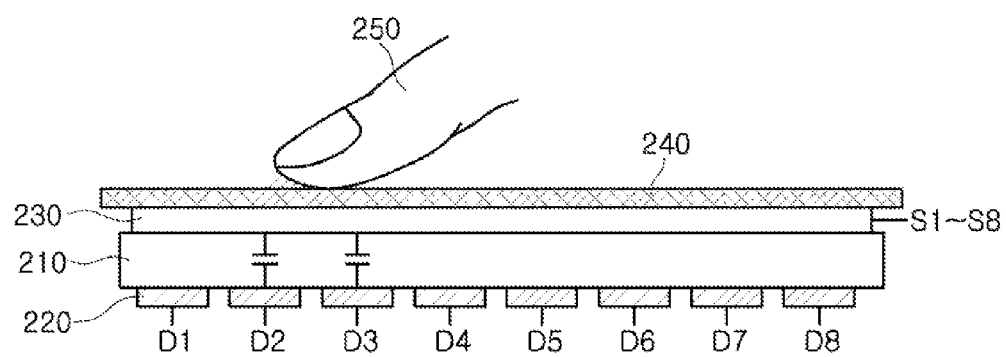
FIG. 3 is a cross-sectional view of the panel unit included in the touchscreen apparatus according to an exemplary embodiment in the present disclosure.

FIG. 3 is a cross-sectional view of the panel unit included in the touchscreen apparatus according to an exemplary embodiment of the present disclosure. FIG. 3 is a cross-sectional view of the panel unit 200 illustrated in FIG. 2, cut in a Y-Z direction. The panel unit 200 illustrated in FIG. 3 may include a cover panel 240 to which a touch interaction is applied, in addition to the substrate 210 and the plurality of electrodes 220 and 230 as described above with respect to FIG. 2. The cover panel 240 may be provided on the second electrode 230 used to detect capacitance.

When the driving signals are applied to the first electrodes 220 through the channels D1 to D8, capacitance may be generated between the first electrodes 220 to which the driving signals are applied and the second electrodes 230.

When a touch object 250 touches the cover panel 240, changes in capacitance may occur in nodes of the first and second electrodes 220 and 230 corresponding to a touch region. The changes in capacitance may be proportionate to an area of the touch object 250. In FIG. 3, capacitance generated between the first electrode 220 and the second electrode 230 connected to the channel D2 and the channel D3, respectively, may be affected by the touch object 250.

Figure 4:
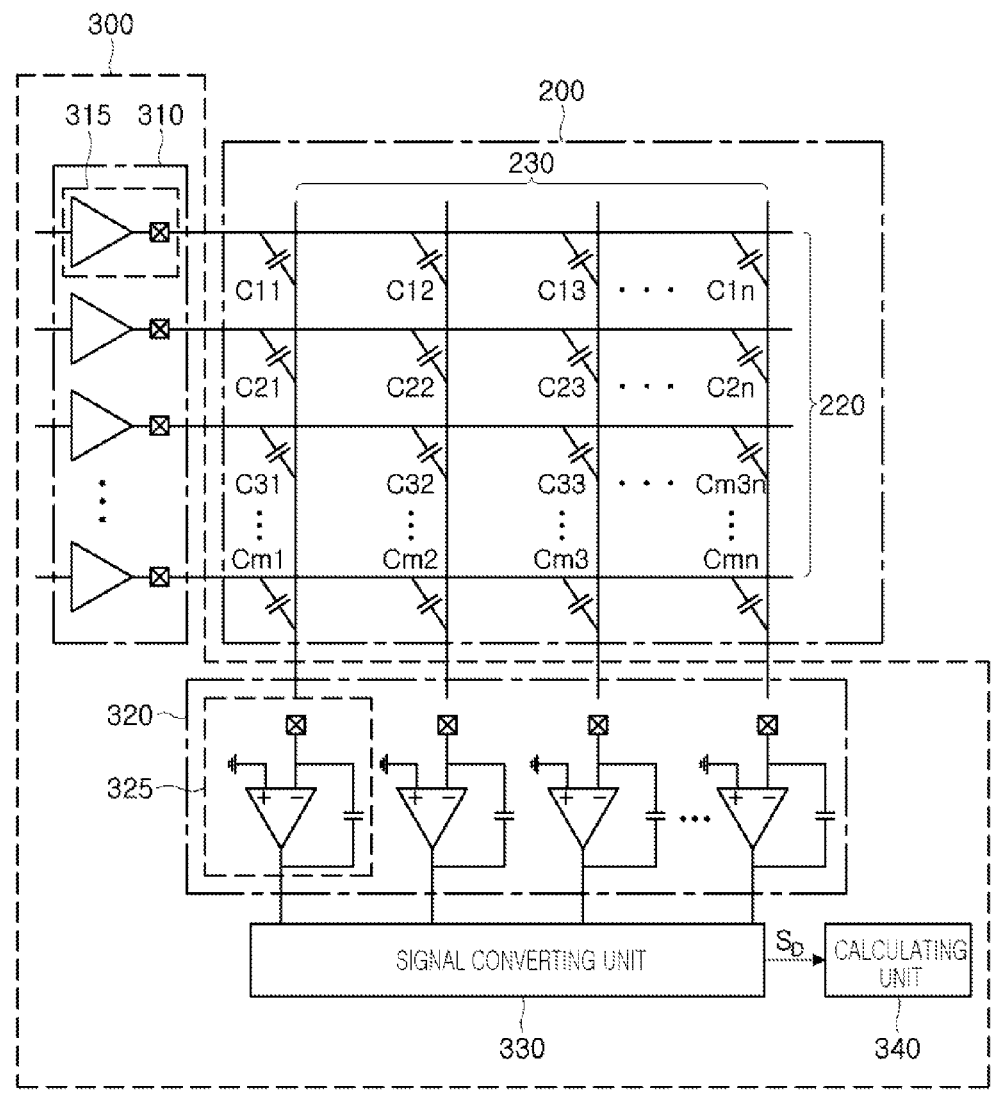
FIG. 4 is a view illustrating the touchscreen apparatus according to an exemplary embodiment of the present disclosure.

FIG. 4 is a view illustrating the touchscreen apparatus according to an exemplary embodiment of the present disclosure. Referring to FIG. 4, the touchscreen apparatus according to the present exemplary embodiment may include the panel unit 200 and a touch interaction sensing apparatus 300.

As described above, the panel unit 200 may include the substrate (not illustrated), a plurality of first electrodes 220 extended in a first axial direction, that is, a horizontal direction of FIG. 4, and a plurality of second electrodes 230 extended in a second axial direction, that is, a vertical direction of FIG. 4, intersecting the first axial direction. Capacitance may be generated in intersection points between the plurality of first electrodes 220 and the plurality of second electrodes 230, and node capacitors C11 to Cmn illustrated in FIG. 4 are used to show capacitance generated in the intersection points between the plurality of first electrodes 220 and the plurality of second electrodes 230 as capacitor components.

The touch interaction sensing apparatus 300 may include a driving circuit unit 310, a sensing circuit unit 320, a signal converting unit 330, and a calculating unit 340. Here, the driving circuit unit 310, the sensing circuit unit 320, the signal converting unit 330, and the calculating unit 340 may be implemented as a single integrated circuit (IC).

The driving circuit unit 310 may include one or more driving signal generating circuits 315 to apply a predetermined driving signal to the plurality of first electrodes 220 of the panel unit 200. The driving signal may be a square wave signal, a sine wave signal, a triangle wave signal, or the like, having a predetermined period and amplitude. Although the case in which the driving signal generating circuits 315 are individually connected to the plurality of first electrodes 220, respectively, is illustrated in FIG. 4, the driving circuit unit 310 may include a single driving signal generating circuit 315 and apply the driving signal to the plurality of first electrodes 220, respectively, using a switching circuit.

The driving circuit unit 310 may sequentially apply the driving signals to each of the plurality of first electrodes 220. In addition, the driving circuit unit 310 may be operated in a scheme of simultaneously applying the driving signals to the plurality of first electrodes 220 or selectively applying the driving signals to only some of the plurality of first electrodes 220 to simply sense whether or not a touch interaction is occurring.

The sensing circuit unit 320 may detect capacitance of the node capacitors C11 to Cmn from the plurality of second electrodes 230. The sensing circuit unit 320 may include a plurality of integration circuits 325 each including at least one operational amplifier and at least one capacitor, wherein the plurality of integration circuits 325 may be connected to the plurality of second electrodes 220, respectively.

The plurality of integration circuits 325 may convert capacitance of the node capacitors C11 to Cmn into a voltage signal to output an analog signal. As an example, the plurality of integration circuits 325 may integrate capacitance to change capacitance into a predetermined voltage and output the voltage.

In the case in which the driving signals are sequentially applied to the plurality of first electrodes 220, since capacitance may be simultaneously detected from the plurality of second electrodes 230, the number of integration circuits 325 may correspond to that of the second electrodes 230.

The signal converting unit 330 may generate a digital signal $S_D$ from the analog signal output from the sensing circuit unit 320. As an example, the signal converting unit 330 may include a time-to-digital converter (TDC) circuit measuring a time in which the analog signal output in a voltage form by the sensing circuit unit 320 reaches a predetermined reference voltage level and converting the measured time into the digital signal $S_D$, or an analog-to-digital converter (ADC) circuit measuring an amount by which a level of the analog signal output from the sensing circuit unit 320 is changed for a predetermined time and converting the measured amount into the digital signal $S_D$.

The calculating unit 340 may detect the touch interaction applied to the panel unit 200 using the digital signal $S_D$. The calculating unit 340 may detect the number, coordinates, gesture operations, or the like, of touch interactions applied to the panel unit 200 using the digital signal $S_D$.

The digital signal $S_D$, a base on which the calculating unit 340 detects the touch interaction, may be numerical value data generated by changes in capacitance occurring the node capacitors C11 to Cmn, in particular, data indicating a difference between capacitance in the case in which the touch interaction does not occur and in the case in which the touch interaction occurs. Generally, in a capacitive-type touchscreen apparatus, since capacitance is decreased in a region that is touched by a conductive material as compared with a region that is not touched, a change in capacitance in the region that is touched by the conductive material may be greater than a change in capacitance in the region that is not touched.

Figure 5:
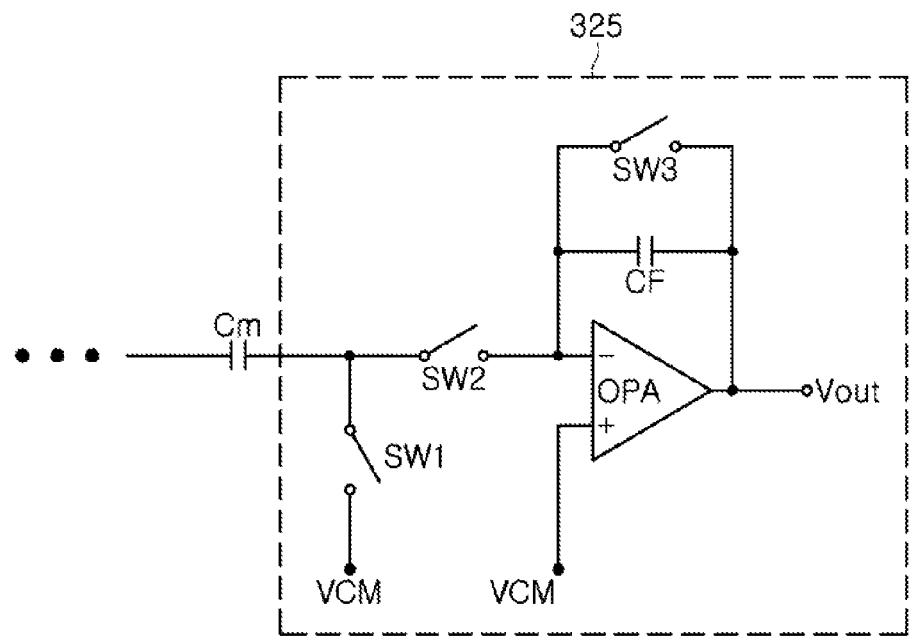
FIG. 5 is a view illustrating an integration circuit used in a touch interaction sensing apparatus according to an exemplary embodiment in the present disclosure.

FIG. 5 is a view illustrating an integration circuit 325 used in a touch interaction sensing apparatus 300 according to an exemplary embodiment of the present disclosure. A node capacitor Cm illustrated in FIG. 5, which corresponds to the node capacitors C11 to Cmn described with reference to FIG. 4, is used to show capacitance generated in the panel unit 200 of FIG. 4 as a capacitor component. Although not illustrated in FIG. 5, the driving signal generating circuit may be disposed on the other side of the integration circuit 325 based on the node capacitor Cm.

The integration circuit 325 may include a first switch SW1, a second switch SW2, a third switch SW3, a feedback capacitor CF, and an operational amplifier OPA. The first switch SW1 may be disposed between the other end of the node capacitor Cm and a common voltage VCM terminal, and the second switch SW2 may be disposed between the other end of the node capacitor Cm and an inverting terminal of the operational amplifier OPA. The third switch SW3 may be disposed between the inverting terminal of the operational amplifier OPA and an output terminal, and the feedback capacitor CF may be connected to the third switch SW3 in parallel. A non-inverting terminal of the operational amplifier OPA may be connected to the common voltage VCM terminal, and the driving signal generating circuit 315 may be disposed on the other side of the node capacitor Cm.

Figure 6:
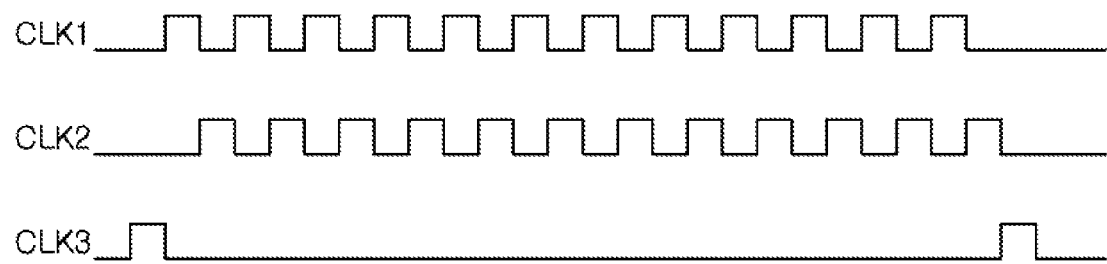
FIG. 6 is a view illustrating clock signals applied to respective first to third switches included in the integration circuit according to an exemplary embodiment in the present disclosure.

FIG. 6 is a view illustrating clock signals applied to respective first to third switches SW1 to SW3 included in the integration circuit 325 according to an exemplary embodiment of the present disclosure. A first clock signal CLK1 may be applied to the first switch SW1, a second clock signal CLK2 may be applied to the second switch SW2, and a third clock signal CLK3 may be applied to the third switch SW3. The first to third switches SW1 to SW3 may be turned on in the case in which the first to third clock signals CLK1 to CLK3 applied to the first to third switches SW1 to SW3, respectively, are at a high level, and may be turned off in the case in which the first to third clock signals CLK1 to CLK3 applied to the first to third switches SW1 to SW3, respectively, are at a low level.

The first and second switches SW1 and SW2 may alternately perform switching operations depending on the first and second clock signals CLK1 and CLK2. Accordingly, electrical charges charged in the node capacitor Cm may be transferred to the feedback capacitor CF and be sequentially integrated. As an example, the clock signals CLK1 and CLK2 applied to the first and second switches SW1 and SW2, respectively, may have a phase difference of 180 degrees therebetween.

The third switch SW3 disposed in parallel to the feedback capacitor CF may be turned on in the case in which the electrical charges charged in the node capacitor Cm are transferred to the feedback capacitor CF by a preset number and are integrated. In the case in which the third switch SW3 is turned on, the electrical charges charged in the feedback capacitor CF may be discharged.

According to the present exemplary embodiment, the operational amplifier OPA included in the integration circuit 325 may be synchronized with at least one of the clock signals CLK1 to CLK3 applied to the first to third switches SW1 to SW3, respectively, to thereby be operated in a low power mode and a normal mode.

In a time section in which the electrical charges are charged in the node capacitor Cm, the operational amplifier OPA may only performs a function of maintaining a level of a voltage Vout of the output terminal. Accordingly, the operational amplifier may be operated in the low power mode. In the time section in which the electrical charges are charged in the node capacitor Cm, the first switch SW1 may be turned on.

In a time section in which the electrical charges are charged in the feedback capacitor CF, the operational amplifier OPA needs to sufficiently transfer the electrical charges charged in the node capacitor Cm to the feedback capacitor CF. Accordingly, the operational amplifier OPA may be operated in the normal mode. In this case, the second switch SW2 may be turned on. Accordingly, the electrical charges charged in the node capacitor Cm may be integrated.

In addition, in a time section in which the electrical charges charged in the feedback capacitor CF are discharged, the operational amplifier OPA needs to rapidly discharge the electrical charges charged in the feedback capacitor CF. Accordingly, the operational amplifier may be operated in the normal mode. In this case, the third switch SW3 may be turned on. Accordingly, the electrical charges integrated by the integration circuit 325 may be discharged.

The integration circuit 325 illustrated in FIG. 5 is only an example of an integration circuit according to the present disclosure, and the present disclosure is not limited thereto. That is, in all cases in which the operational amplifier is operated in the normal mode in the time section in which the electrical charges are charged in at least one feedback capacitor included in the integration circuit and the time section in which the electrical charges are discharged from the feedback capacitor and is operated in the low power mode in other time sections, for example, the time section in which the electrical charges in the node capacitor, regardless of a configuration, disposition, and the number of elements of the integration circuit, may fall within the scope of the present disclosure.

Figure 7:
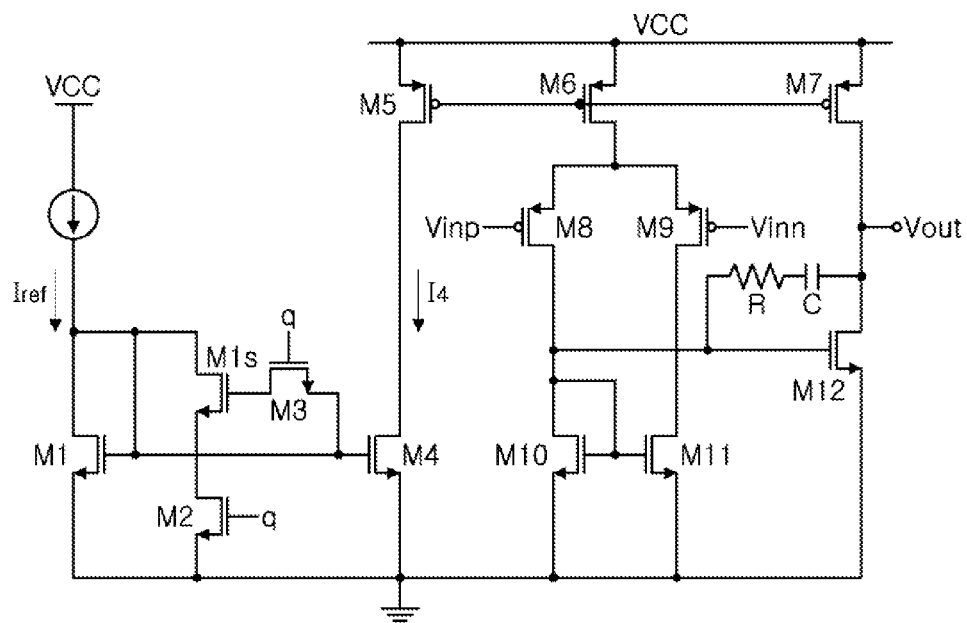
FIG. 7 is a circuit diagram illustrating an example of an operational amplifier of the touch interaction sensing apparatus according to an exemplary embodiment in the present disclosure.

FIG. 7 is a circuit diagram illustrating an example of an operational amplifier OPA that may be used in the integration circuit 325 of the touch interaction sensing apparatus 300 according to an exemplary embodiment of the present disclosure. In FIG. 7, Vinp may indicate a voltage signal applied to a non-inverting terminal of the operational amplifier OPA, and Vinn may indicate a voltage signal applied to an inverting terminal of the operational amplifier OPA.

FIG. 7 illustrates an example in which an operational amplifier that may be designed in various schemes is partially modified in order to be operated in the low power mode and the normal mode. Referring to FIG. 7, it may be appreciated that transistors M1s, M3, and M2 are added to a circuit of a generally used operational amplifier.

Hereinafter, a detailed description of a general operational amplifier will be omitted, and configurations for operating the operational amplifier in the low power mode and the normal mode will mainly be described.

A current I4 flowing to a transistor M4 may be mirrored by transistors M5 to M7 and used in each element. That is, an amount of a current used in an entire operational amplifier may be determined by the current I4.

According to the present exemplary embodiment, an amount of the current I4 flowing to the transistor M4 may be controlled depending on a signal q applied to gates of the transistors M2 and M3 to decrease an amount of power consumed in the entire operational amplifier.

The signal q applied to the gates of the transistors M2 and M3 may be in a low level in a section in which the first clock signal CLK1 has a low level and may have a high level in a section in which one of the second and third clock signals CLK2 and CLK3 is in the high level.

In the normal mode, the signal q applied to the gates of the transistors M2 and M3 may be in the low level. Accordingly, the transistors M2 and M3 may be turned off. In this case, the current I4 flowing in the transistor M4 may be represented by the following Mathematical Equation 1. In Mathematical Equation 1, W and L indicate a width and a length of transistors, respectively.

$$I4 = \frac{(W_4/L_4)}{(W_1/L_1)} \times Iref \qquad \text{[Mathematic Equation 1]}$$

In the low power mode, the signal q applied to the gates of the transistors M2 and M3 may be in the high level. Accordingly, the transistors M2 and M3 may be turned on. In this case, the current I4 flowing to the transistor M4 may be represented by the following Mathematical Equation 2.

$$I4 = \frac{(W_4/L_4)}{(W_1/L_1) + (W_{1s}/L_{1s})} \times Iref \qquad \text{[Mathematical Equation 2]}$$

Referring to Mathematical Equations 1 and 2, it may be confirmed that the amount of the current flowing to the transistor M4 is decreased by the transistor M1s. Accordingly, the amount of the power consumed in the entire operational amplifier may be decreased.

Figure 8:
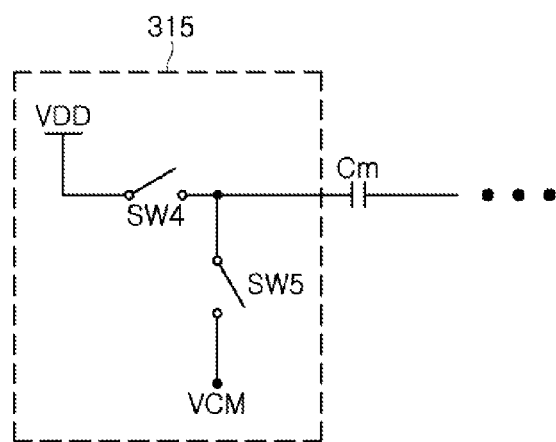
FIG. 8 is a view illustrating a driving signal generating circuit used in the touch interaction sensing apparatus according to an exemplary embodiment in the present disclosure.

FIG. 8 is a view illustrating a driving signal generating circuit 315 used in the touch interaction sensing apparatus 300 according to an exemplary embodiment of the present disclosure. As described above, a node capacitor Cm illustrated in FIG. 8, which corresponds to the node capacitors C11 to Cmn described with reference to FIG. 4, is used to show capacitance generated in the panel unit 200 of FIG. 4 as a capacitor component. Although not illustrated in FIG. 8, the integration circuit may be disposed at the other side of the driving signal generating circuit 315 based on the node capacitor Cm.

The driving signal generating circuit 315 may include a fourth switch SW4 disposed between a driving voltage VDD terminal and one end of the node capacitor Cm and a fifth switch SW5 disposed between one end of the node capacitor Cm and a common voltage VCM terminal, and the integration circuit 325 may be disposed on the other side of the node capacitor Cm. The common voltage VCM may generally have an intermediate level of the driving voltage VDD, but is not limited thereto. That is, the common voltage may have a ground (GND) level or a preset level.

Figure 9:
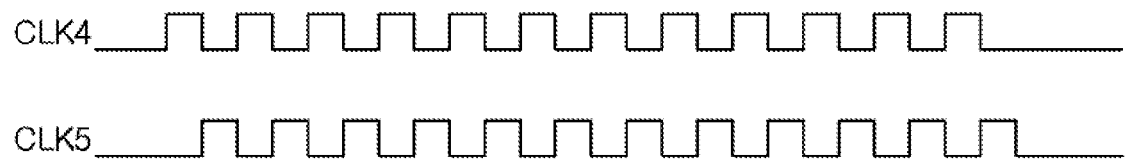
FIG. 9 is a view illustrating clock signals applied to respective fourth and fifth switches included in the driving signal generating circuit according to an exemplary embodiment in the present disclosure.

FIG. 9 is a view illustrating clock signals applied to respective fourth and fifth switches SW4 and SW5 included in the driving signal generating circuit 315 according to an exemplary embodiment of the present disclosure. Here, a fourth clock signal CLK may be applied to the fourth switch SW4, and a fifth clock signal CLK5 may be applied to the fifth switch SW5. In the case in which the fourth and fifth clock signals CLK4 and CLK5 are in a high level, the fourth and fifth switches SW4 and SW5 may be turned on, and in the case in which the fourth and fifth clock signals CLK4 and CLK5 are in a low level, the fourth and fifth switches SW4 and SW5 may be turned off.

The fourth and fifth switches SW4 and SW5 of the driving signal generating circuit 315 may alternately perform switching operations depending on the fourth and fifth clock signals CLK4 and CLK5 to generate predetermined driving signals. As an example, the fourth and fifth clock signals CLK4 and CLK5 applied to the fourth and fifth switches SW4 and SW5, respectively, may have a phase difference of 180 degrees therebetween.

Here, the fourth clock CLK4 applied to the fourth switch SW4 may be the same as the first clock signal CLK1 applied to the first switch SW1 of FIG. 5, and the fifth clock signal CLK5 applied to the fifth switch SW5 may be the same as the second clock signal CLK2 applied to the second switch SW2 of FIG. 5.

As set forth above, the integration circuit, the touch interaction sensing apparatus and the touchscreen apparatus, according to exemplary embodiments of the present disclosure, may decrease power consumption.

While exemplary embodiments have been shown and described above, it will be apparent to those skilled in the art that modifications and variations could be made without departing from the spirit and scope of the present disclosure as defined by the appended claims.

What is claimed is:

1. A touchscreen apparatus comprising:
   a panel unit including a plurality of first electrodes extended in a first direction and a plurality of second electrodes extended in a second direction intersecting with the first direction;
   a driving circuit unit configured to apply driving signals to the plurality of first electrodes; and
   a sensing circuit unit connected to the plurality of second electrodes and configured to detect capacitance formed at intersection points between the plurality of first electrodes and the plurality of second electrodes,
   wherein the sensing circuit unit includes:
   a plurality of integration circuits each connected to one of the plurality of second electrodes, each of the plurality of integration circuits including a plurality of switches,
   at least one operational amplifier, and
   at least one feedback capacitor and configured to integrate capacitance,
   wherein the operational amplifier is configured to be synchronized with a clock signal applied to at least one of the plurality of switches to be operated in each of a normal mode and a low power mode in a same period of the clock signal, and
   wherein the operational amplifier consumes less power in the low power mode than in the normal mode by adjusting an amount of current flowing to at least one transistor included in the operational amplifier.

2. The touchscreen apparatus of claim 1, wherein the operational amplifier is operated in the low power mode in response to the driving signal being in a high level.

3. The touchscreen apparatus of claim 1, wherein the operational amplifier is operated in the normal mode in response to capacitance being transferred to the feedback capacitor.

4. The touchscreen apparatus of claim 1, wherein the operational amplifier is operated in the normal mode in response to electrical charges charged in the feedback capacitor being discharged.

* * * * *